June 12, 1956 S. OLDBERG 2,749,889
VALVE GEAR MECHANISM
Filed Sept. 9, 1950 2 Sheets-Sheet 1
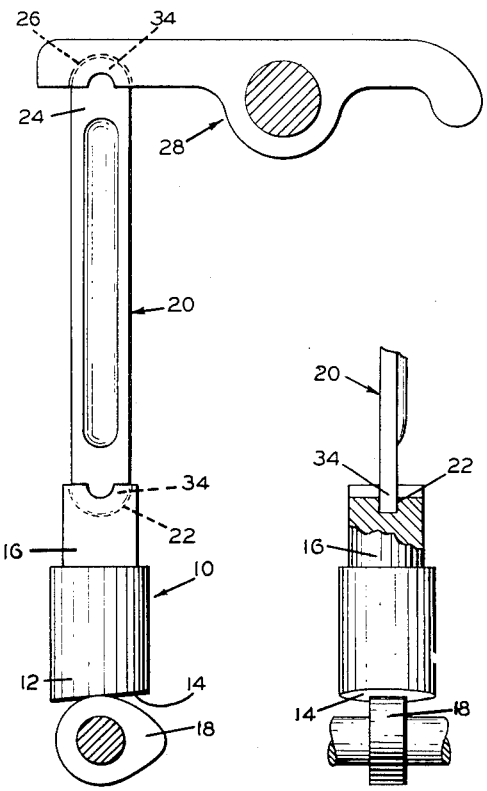
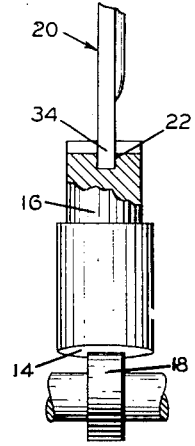
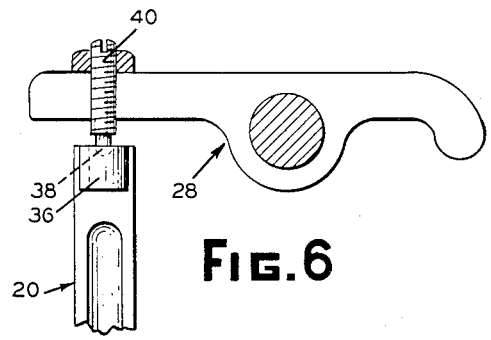
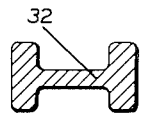
Fig.3  Fig.4
Fig.6
Fig.7  Fig.8
Fig.1  Fig.2
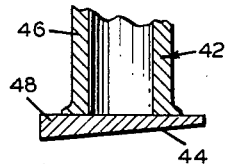
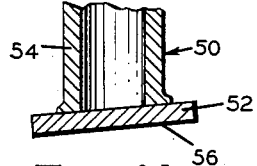
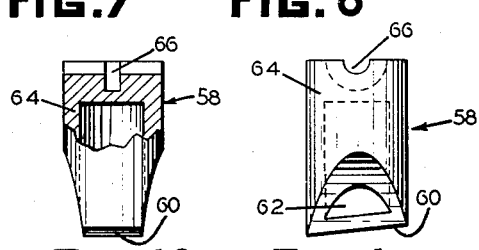
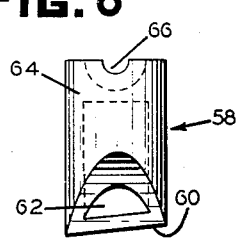
Fig.13  Fig.14
Fig.9  Fig.11
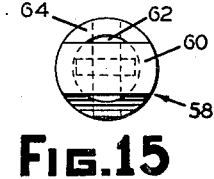
Fig.15
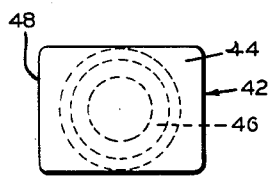
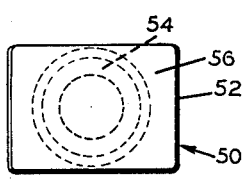
Fig.10  Fig.12
*INVENTOR.*
SIDNEY OLDBERG
BY
*McDonald & Teagno*
ATTORNEYS

INVENTOR.
SIDNEY OLDBERG

United States Patent Office 2,749,889
Patented June 12, 1956

2,749,889

VALVE GEAR MECHANISM

Sidney Oldberg, Birmingham, Mich., assignor to Eaton Manufacturing Company, Cleveland, Ohio, a corporation of Ohio Application September 9, 1950, Serial No. 184,019

6 Claims. (Cl. 123—90)

This invention relates to valve gear systems for internal combustion engines and more particularly to the novel construction of cooperative tappet and push rod elements thereof.

Broadly, the invention comprehends the provision of a tappet utilized in the valve gear system of an internal combustion engine having an inclined cam engaging face permitting of the use of push rods of economical construction having lateral stiffness in only one plane and assuring perfect alignment between the tappet face and cam with which it is engageable.

Among the several objects of the invention is the provision of a tappet having a cam engaging surface which is out of square with the axis thereof by a few degrees that assures perfect alignment thereof with the cam surface engageable therewith regardless of the misalignment of the cam shaft axis to the tappet axis; that does not rotate; that permits of reduction in the width of the cam engaging surface of the tappet; that permits of the use of push rods of I beam section or other varied shapes having great lateral stability in one plane and only bending rigidity in a right angle plane thereto sufficient to insure stability as a column and that has extremely high capacity even though the tappet does not rotate.

Other objects and advantages of the invention will appear from the following description taken in connection with the drawings, forming a part of the specification; and in which;

Fig. 1 is a side elevation view of the basic elements of a valve gear system including cooperative cam, tappet, push rod and rocker arm members embodying the invention;

Fig. 2 is a fragmentary partly cross-sectional side elevation view of Fig. 1;

Figs. 3 and 4 are cross-sectional views of varied types of push rod adapted for use in the system of Fig. 1;

Fig. 6 is a fragmentary partially cross-sectionalized view of a modified form of push rod and rocker arm arrangement from that of Fig. 1;

Figs. 7 and 8 are top elevation views of the push rods of Figs. 3 and 4 with inserts applied thereto;

Fig. 9 is a fragmentary cross-sectionalized view of a modified form of tappet from that shown by Fig. 1;

Fig. 10 is a bottom elevation view of the tappet of Fig. 9;

Fig. 11 is a fragmentary cross-sectionalized view of another modified form of tappet from that shown by Fig. 1;

Fig. 12 is a bottom elevation view of the tappet of Fig. 11;

Fig. 13 is a front elevation partially cross-sectionalized view of a further modified form of tappet from that shown by Fig. 1;

Fig. 14 is a side elevation view of the tappet of Fig. 13; and

Fig. 15 is a bottom elevation view of the tappet of Figs. 13 and 14.

Figure 5:
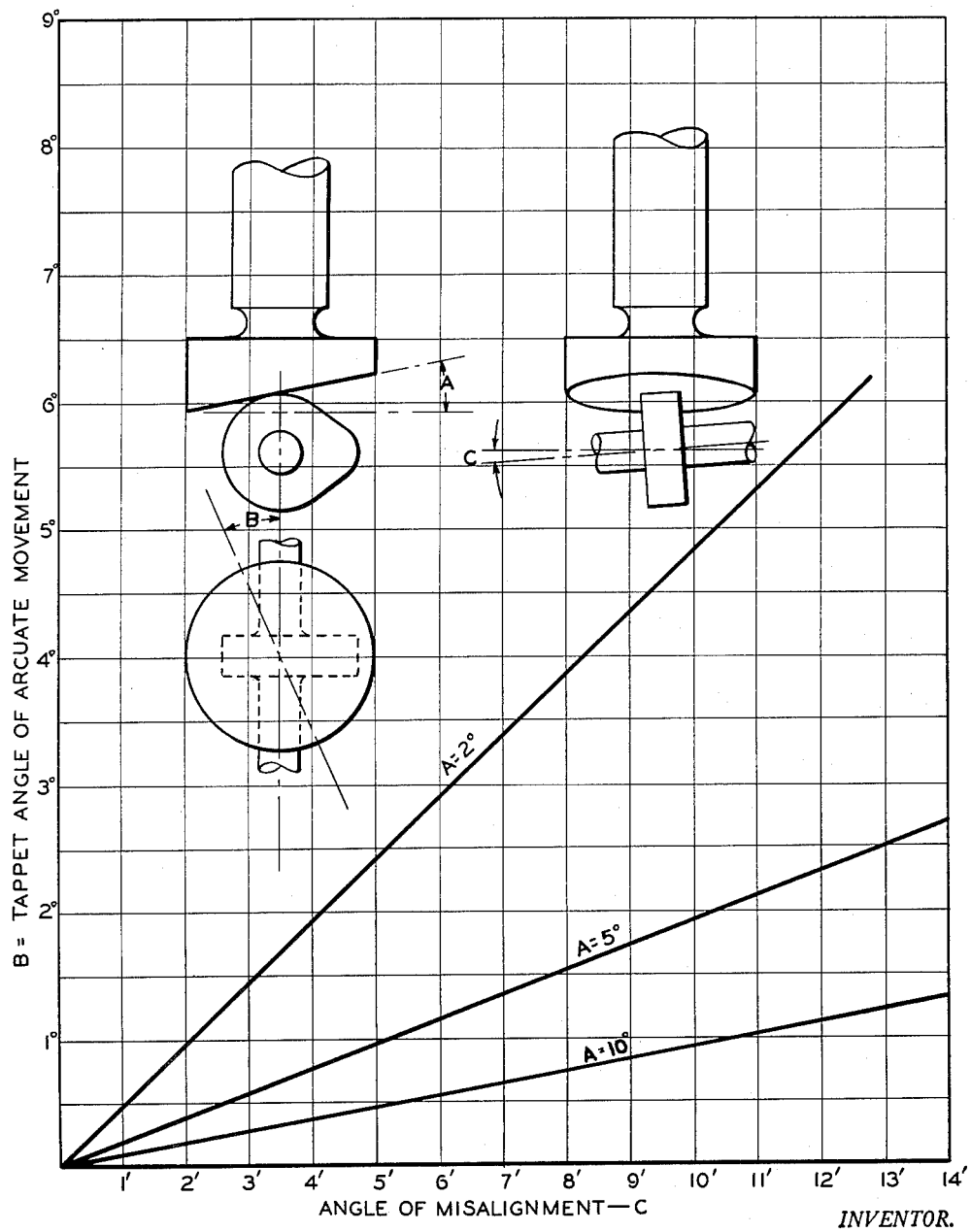
Fig. 5 is a chart illustrating the arcuate movement of a tappet for a given angle of misalignment between cam and tappet and angular inclination of the cam engaging face thereof together with a showing of the derivation of the specific angles utilized.

This tappet was devised for the purpose of improving the over-all operational setup of valve gear systems of internal combustion engines such that through the provision of an inclined face of predetermined angularity on the cam engaging surface of the tappet, substantially perfect alignment can be maintained between the cam surface and the inclined tappet face providing extremely high capacity therefor. Through the provision of a tappet face out of square with the axis for the tappet, the tappet will initially upon contact of the tappet face on its associated cam, move rotatively to a position of perfect alignment with the cam regardless of the misalignment of the cam shaft axis to the tappet axis.

Assuming, as is usually the case, that the misalignment between the cam and tappet is constant for all positions of the cam there would be no movement of the tappet about its axis after the tappet initially rotatively moves to a position to attain perfect alignment with the cam.

By so inhibiting the tappet from rotation in transmitting motion from the cam to valve gear mechanism to be operated thereby with predetermined movement, many material elements of the valve gear system to which this form of tappet is applied can be varied to provide for improved design and economy of construction thereof. A couple instances of structural change are the reduction in width of the tappet face which not only reduces the amount of material required, but permits of greater latitude in cam design where the cam spacing is close and greater latitude in the design of push rods wherein the push rods can be made of varying cross-section of stamped or similar economical construction having great lateral stiffness in one plane constituting the direction of acceleration, whereas in the plane at right angle thereto it need only have a bending rigidity sufficiently high to insure stability as a column.

Referring to Figs. 1 and 2 of the drawings for more specific details of the invention 10 represents generally a tappet of the hydraulic variety including a cylindrical body member 12, having an angular or inclined face 14, and a plunger 16 reciprocable in a bore of body member 12.

Inclined face 14 as will be noted lies in a plane angularly disposed to a plane normal to the axis of the tappet, said inclination preferably being made between 2 and 5 degrees, the purpose of which will hereinafter appear.

Whereas the inclined face is adapted to have contacting engagement with a cam 18, the cam shaft axis of which is arranged substantially normal to the axis of the tappet, the free end of the plunger is adapted to receive one end of a push rod 20 in a semi-circular groove 22 resembling a Woodruff key slot provided therein. The end 24 of push rod 20 axially oppositely disposed from the tappet plunger is adapted to be received in a like slot 26 of a rocker arm 28 to the slot 22 in plunger 16.

By so providing the tappet body member 12 with inclined face 14 engageable with cam 18 the body 12 will be moved rotatively a predetermined degree depending on the angularity of the inclined face and the amount of misalignment from a normal between the axis of the tappet and cam shaft to a position wherein a condition of substantially perfect alignment will be attained between the cam surface and surface of the inclined face. This attainment of alignment assures extremely high capacity for the tappet face even though after alignment is attained no further movement of the tappet body member 12 about its axis will occur. This condition will prevail assuming the errors in misalignment between the cam shaft and tappet are constant for all positions of the tappet. Through the elimination of rotative movement or rotation of the tappet body and especially as regards hydraulic tappets various elements of said tappet structures such as springs and sealing boots (in the case of self-contained hydraulic tappets) can be safeguarded from fracture and thereby afford a simple yet feasible tappet construction.

Reference is had to the chart Fig. 5 wherein is shown the calculated amount the tappet must move arcuately to accommodate various degrees of misalignment and for various angles of inclination of the cam contacting face of the tappet.

In so preventing oscillation of the tappet, once alignment is attained between the cam and tappet engageable surfaces, the push rod 20 can be made to have any of several cross-sectional shapes wherein lateral stability of the push rod is required in only one plane; that is, in the direction of acceleration, whereas in the right angle plane thereto the bending rigidity need only be high enough to insure stability as a column.

Figs. 3 and 4 illustrate curved or ribbed and I beam cross-section push rods 30 and 32 respectively. For example, the I section type of push rod 32 has a maximum moment of inertia about an axis parallel to an engine axis so that oscillation in a direction perpendicular to the engine axis will produce a minimum of vibration in the push rod, whereas the moment of inertia normal thereto may be reduced since there is no vibration excitation in this direction. Through the permissible use of push rods of this design a material saving in the cost of manufacture thereof is achieved over the conventionally employed solid or tubular push rods wherein stability in all planes passing through the axis thereof is required.

Inasmuch as the plunger 16 of the tappet structure of Figs. 1 and 2 is made to have free relative rotation to body member 12, the body member 12 can move rotatively to alignment position without affecting the plunger and its socketed relation with push rod 20 wherein push rod 20 has oppositely curved ends 34 fitting the bottom of slots 22 and 26 of the respective plunger and rocker arm permitting of rocking action solely therewith.

Figs. 6 through 8 illustrate a rocker arm push rod arrangement wherein an insert 36 is applied to either of the push rods 30 or 32 for engagement in a socket 38 at the top end thereof by an adjusting screw 40 forming a part of rocker arm 28. This arrangement is suitable for a mechanical tappet wherein the body would terminate such as plunger 16 in a Woodruff type slot for receipt of the other end of the push rod similarly as shown in Fig. 1.

Figs. 9 and 10 illustrate one form of tappet 42 having a face 44 of much narrower width than conventional tappets in view of the fact that inasmuch as the tappet is kept from rotating the engagement surface required faces along a zone representing a width slightly greater than the width of the engaging cam, thereby providing a material saving of metal for the tappet head member, and also permitting greater latitude in cam design where cam spacing is at a premium. Reference is made to the chart Fig. 5 wherein it is to be noted that within practical limits the maximum arcuate movement of the tappet would amount to about ten degrees thus indicating the small additional width of the cam engaging surface required beyond the width of the cam itself thereby affording a material saving in metal in permitting the manufacture of tappets having much narrower cam contacting surfaces than are required by conventional tappets. Tappet 42, Figs. 8 and 10 comprises a cylindrical body 46 having a head member 48 fixedly secured at right angles to the body, head member 48 being of a tapered form as to provide face 44 of required inclination.

The tappet 50 illustrated by Figs. 11 and 12 differs from that of Figs. 9 and 10 in that the head member 52 thereof is of uniform thickness secured at an angle to cylindrical body member 54 which is made angular at one end thereof to thereby provide an angular surface 56 adapted for engagement with a cam. This merely illustrates the varied manners in which an angular surface can be feasibly and economically provided on a tappet.

Figs. 13 through 15 illustrate a further embodiment of a tappet 58 which can be advantageously made taking advantage of the non-rotation control afforded by providing an angular surface on the cam engaging face 60 thereof. The tappet 58 is a barrel type of tappet which is normally of cast construction such that by the permissible narrowing of the face 60 port holes 62 can be provided in the body 64 thereof which greatly simplifies casting. As will be noted a Woodruff type slot 66 is provided in its push rod engaging end for receipt of one end of a push rod of the type shown by Fig. 6 therein.

While this invention has been described in connection with certain specific embodiments, the principle involved is susceptible of numerous other applications that will readily occur to persons skilled in the art. The invention, therefore, is limited only as indicated by the scope of the appended claims.

What I claim is:

1. In a valve gear system for an internal combustion engine having valve actuating means comprising a valve actuating rocker arm pivotal about a fixed axis intermediate its ends, a cam actuated tappet plunger, said tappet plunger having an axis generally perpendicular to the axis of said pivot, a push rod having a first axial extremity thereof pivotally coupled, non-rotatably about its longitudinal axis, to one end of said rocker arm and the second end of said push rod being coupled non-rotatably about its longitudinal axis to said plunger.

2. In a valve gear system according to claim 1 wherein said couplings permit pivotal motion of said push rod with respect to said rocker arm and said plunger, respectively, about said points of coupling.

3. A system according to claim 1 wherein the push rod is circular in shape on the opposite ends thereof received in complementary slots, respectively, in the tapped plunger and rocker arm.

4. A system according to claim 1 wherein the push rod is of such cross-sectional shape as to have great lateral stability in one plane and only bending rigidity in a plane at right angles thereto sufficient to insure stability in a column.

5. A valve gear system for internal combustion engines comprising a tappet member and a pivotal rocker arm having mutually perpendicular axes, a push rod of cross-sectional shape so as to have great lateral stability in one plane and only bending rigidity in a plane at right angles thereto, sufficient to insure stability in a column, having one axial extremity thereof non-rotatively coupled to the tappet member and said rocker arm having one extremity thereof pivotally engageable with the extremity of the push rod opposite from the extremity coupled to the tappet.

6. A valve gear system for internal combustion engines comprising a tappet plunger and a pivotal rocker arm having perpendicular axes, a push rod of I cross-sectional shape having one axial extremity thereof non-rotatably coupled to the axial extremity of the tappet plunger, one extremity of said rocker arm being engageable with the extremity of the push rod opposite from the extremity coupled to the tappet, said push rod having a circular end at said one axial extremity received in a complementary slot in said tappet.

References Cited in the file of this patent

UNITED STATES PATENTS

| | | |
|---|---|---|
| 1,159,708 | Rathburn | Nov. 9, 1915 |
| 1,798,508 | Tucker | Mar. 31, 1931 |
| 1,820,299 | Church | Aug. 25, 1931 |
| 2,111,734 | Riley | Mar. 22, 1938 |
| 2,160,257 | Appel | May 30, 1939 |
| 2,278,963 | Arola | Apr. 7, 1942 |
| 2,438,631 | Bergmann | Mar. 30, 1948 |
| 2,567,689 | Bishop | Sept. 11, 1951 |
| 2,572,968 | Bachle | Oct. 30, 1951 |

FOREIGN PATENTS

| | | |
|---|---|---|
| 122,315 | Great Britain | Jan. 23, 1919 |
| 21,968 | France | Apr. 21, 1921 |
| | (Addition to 504,391) | |